United States Patent [19]

Wakahara

[11] Patent Number: 4,533,259
[45] Date of Patent: Aug. 6, 1985

[54] APPARATUS FOR DETECTING THE LOCAL TEMPERATURE VARIATIONS OF AN OBJECT AND THE SITES OF THE TEMPERATURE VARIATIONS

[75] Inventor: Yasushi Wakahara, Yokohama, Japan

[73] Assignee: Tokyo Shibaura Denki Kabushiki Kaisha, Kawasaki, Japan

[21] Appl. No.: 568,512

[22] Filed: Jan. 9, 1984

Related U.S. Application Data

[63] Continuation of Ser. No. 274,193, Jun. 16, 1981, abandoned.

[30] Foreign Application Priority Data

| Jun. 23, 1980 [JP] | Japan | 55-84902 |
| Jun. 23, 1980 [JP] | Japan | 55-84905 |
| Sep. 26, 1980 [JP] | Japan | 55-132843 |

[51] Int. Cl.$^3$ .................. G01R 31/11; G01K 7/38
[52] U.S. Cl. .................. 374/166; 324/52; 374/177
[58] Field of Search ............ 73/362 CP, 342; 333/158, 162, 163, 236, 243, 241; 324/52; 33/125 W, 125 T

[56] References Cited

U.S. PATENT DOCUMENTS

| Re. 24,813 | 4/1960 | Nordlin | 333/163 |
| 2,615,973 | 10/1952 | Heath . | |
| 2,727,945 | 12/1955 | Prache | 333/162 |
| 2,926,343 | 2/1960 | Postal . | |
| 3,413,540 | 11/1968 | Vansant . | |
| 3,418,207 | 12/1968 | Becker | 324/52 |
| 3,510,762 | 5/1970 | Leslie | 73/342 |
| 3,588,689 | 6/1971 | Crawford | 324/52 |
| 4,023,412 | 5/1977 | Luke . | |
| 4,301,428 | 11/1981 | Mayer | 333/236 |

FOREIGN PATENT DOCUMENTS

| 2292962 | 6/1976 | France . | |
| 733763 | 7/1955 | United Kingdom | 333/162 |

OTHER PUBLICATIONS

"Ferrite Components for UHF and Microwave System"; by Cacheris et al.; from Electronics 9/22/61, FIG. 4B on p. 41.

"Metallic Glasses", American Society of Metals; paper presented at a Seminar of the Materials Science Division, 9/18/76, pp. 275-338.

"Amorphous Ferromagnets", by Luborsky; report No. 77CRD274, of General Electric, Jan. 1978.

Primary Examiner—Charles Frankfort
Assistant Examiner—Denis E. Corr
Attorney, Agent, or Firm—Oblon, Fisher, Spivak, McClelland & Maier

[57] ABSTRACT

An apparatus for detecting the local temperature variations of an object and the sites of the temperature variations comprises, at least one temperature-sensing element formed of a band-shaped magnetic material having a prescribed Curie temperature;

a pulse generator for supplying a pulse signal to at least one end of the temperature-sensing element;

a pulse time difference detector for detecting a difference between a point of time at which the pulse signal is received and a point of time at which the reflected pulse signal of the pulse signal from the site of the temperature-sensing element where its characteristic impedance has changed is received; and a temperature variation site detector for determining a site of temperature variation from the detected pulse time difference.

8 Claims, 20 Drawing Figures

F I G. 3(b)
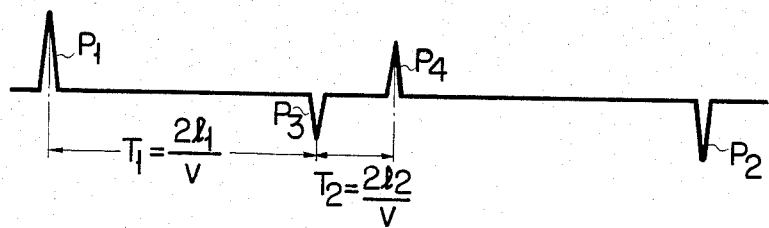
F I G. 4
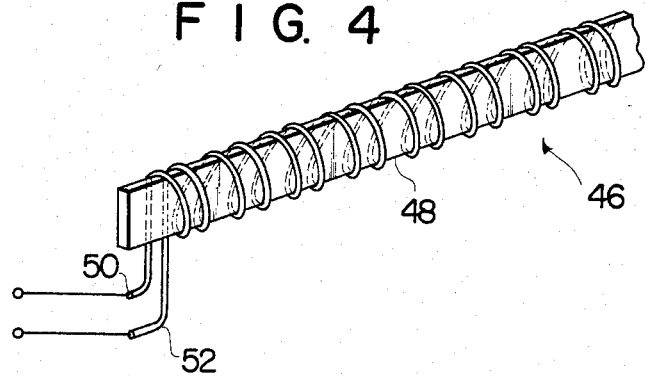
F I G. 5
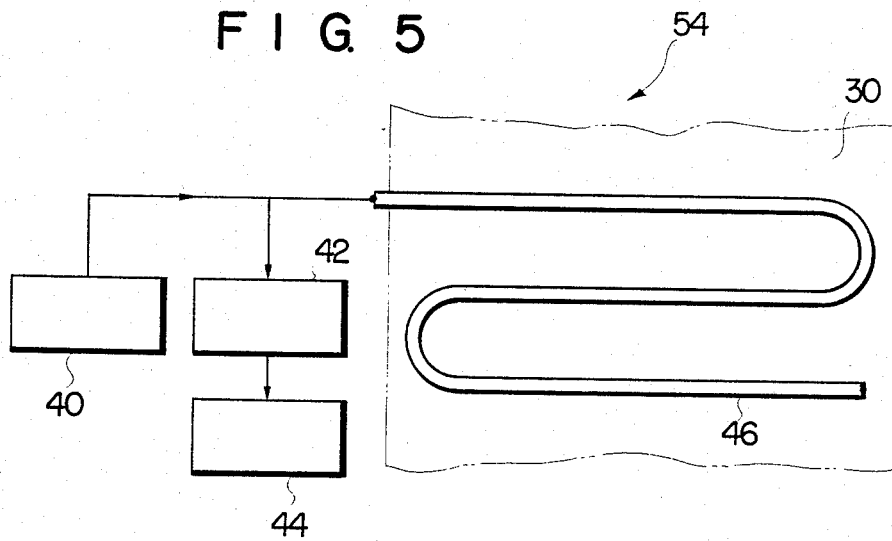

F I G. 12
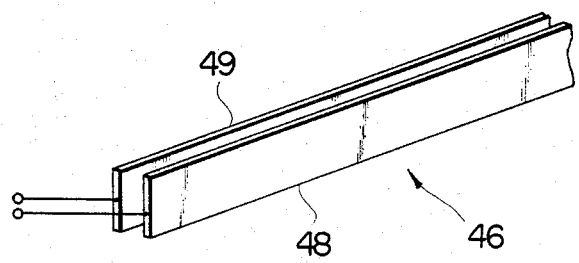
F I G. 13
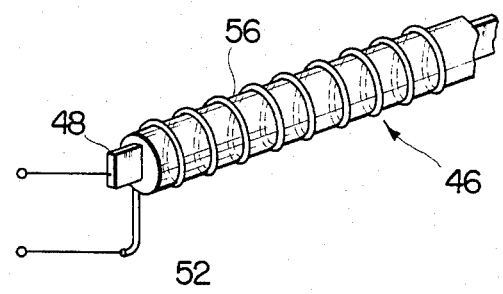
F I G. 14
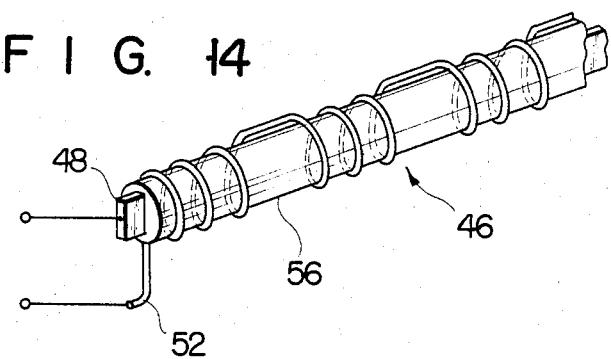

APPARATUS FOR DETECTING THE LOCAL TEMPERATURE VARIATIONS OF AN OBJECT AND THE SITES OF THE TEMPERATURE VARIATIONS

This application is a continuation, of application Ser. No. 274,193, filed June 16, 1981, and now abandoned.

BACKGROUND OF THE INVENTION

This invention relates to an apparatus for detecting the local temperature variations of an object and the sites of the temperature variations.

Recently, an apparatus for detecting local temperature variations of an object and the sites of the temperature variations (hereinafter referred to as "a temperature variation-site detecting apparatus") has been developed which detects abnormal temperatures occurring, for example, in an elongate pipe on a tank or the leakage of a hot or cold liquid and the sites of all these accidents by utilizing changes with time in the characteristic impedance of a temperature variation-detecting cable comprising a magnetic material disposed between a pair of conductors.

The U.S. Pat. No. 4,023,412 sets forth the above-mentioned type of temperature variation-site detecting apparatus. FIG. 1 is a schematic diagram of an example of a prior art temperature variation-site detecting apparatus. A temperature variation-detecting cable 32 is mounted on part of the outer peripheral wall of an object 30, for example, a tank. The cable 32 is, as shown in FIG. 2, of the concentric type which comprises a linear core conductor 34, outer hollow cylindrical conductor 36 surrounding the core conductor 34 and a magnetic material 38 which has a retatively low Curie temperature and is filled between the outer conductor 36 and core conductor 34. The magnetic material 38 is formed by mixing ferrite powder with, for example, an insulating adhesive. This magnetic material 38 is chosen to have such a Curie temperature as is set at the upper or lower limit of a temperature range regarded as, for example, an abnormal level.

The starting end of the cable 32 in connected to a pulse generator 40 and pulse time difference detector 42. The terminal end of the cable 32 is short-circuited or may be left open. Upon receipt of a set signal, the pulse generator 40 sends forth a short width pulse signal to the starting end of the cable 32. The pulse time difference detector 42 counts a difference between a point of time at which the output pulse signal is received and a point of time at which the pulse signal is reflected from the prescribed spot of the cable 32. A signal denoting the time difference is conducted to a detector 44 for indicating a site at which temperature variations take place (hereinafter referred to as "a temperature variation site detector). This temperature variation site detector 44 determines the occurrence or absence of abnormal temperature and the site of the abnormal temperature from the above-mentioned time difference thus detected.

A pulse signal emitted from the pulse generator 40 is supplied to the starting end of the cable 32, and then conducted through the cable 32. Where, at this time, a substantially fixed temperature prevails over the whole of the object 30, then the impedance of the cable 32 also remains fixed over the whole of the object 30. Therefore, the output pulse signal is reflected only at the terminal end of the cable 32. At this time, the pulse time difference detector 42 counts a difference $T_0(T_0 = 2 l/v)$ (FIG. 3(a)) between the point of time at which an output pulse signal $P_1$ is received and the point of time at which a reflected pulse signal $P_2$ is received at the terminal end of the cable 32. The character l denotes the total length of the cable 32, and the character V represents the speed at which a pulse signal is transmitted through the cable. Where a time difference $T_0$, for example, is detected, then the temperature variation site detector 44 judges that the object 30 has no abnormal temperature variations.

Where the temperature of the portion of the cable 32 near a given point A on the object 30 at which an abnormally high temperature occurs increases over the Curie temperature of the magnetic material 38, then the relative permeability of the magnetic material 38 substantially stands at 1. As a result, the impedance of the cable 32 at point $Q_1$ near the aforementioned point A falls, causing the above-mentioned pulse signal to be reflected at the point $Q_1$. At this time, the pulse time difference detector 42 counts a difference $T_1(T_1 = 2 l_1/v)$ (FIG. 3(b)) between a point of time at which the output pulse signal $P_1$ is received and a point of time at which a pulse signal $P_3$ is reflected at point $Q_1$. The character $l_1$ is a distance from the starting end of the cable 32 to point $Q_1$. Where the aforementioned abnormal temperature site A covers an area defined by a prescribed distance $l_2$, then the pulse time difference detector 42 also counts a difference $T_2(T_2 = 2 l_2/v)$ between a point of time at which the pulse $P_3$ is reflected at point $Q_1$ of the abnormal temperature site A and a point of time at which a pulse $P_4$ is reflected at point $Q_2$. Where the time differences $T_1$, $T_2$ ($T_1 < T_0$, $T_2 < T_0$) are detected, then the temperature variation site detector 44 judges that an abnormal temperature arises in the object 30, and determines the site and range of the abnormal temperature.

The aforementioned prior art temperature variation-site detecting apparatus indeed has the advantages that it is possible to easily detect the occurrence of abnormal temperatures in an object, for example, a tank, and the sites of the abnormal temperatures; and sites of abnormal temperatures can be detected over a broad area of the object 30, thereby making it possible to easily determine sites of abnormal temperatures even in a large object.

Nevertheless, the above-mentioned prior art temperature variation-site detecting apparatus is accompanied with the following drawbacks. The cable 32 is constructed by uniformly filling a magnetic material 38 in a space defined between the core conductor 34 and outer hollow cylindrical conductor 36. In this case, the conventional process comprises mixing ferrite powder with an adhesive, and filling the mixture between the conductors 34, 36 or applying ferrite powder on the outer peripheral wall of the core conductor 34 by means of a rubber type adhesive. Consequently this conventional apparatus has the drawbacks that a time-consuming process is involved of previously crushing ferrite into powder and then uniformly mixing the powder with the adhesive, thus undesirably leading to an increase in the cost of producing the cable 34 and consequently a temperature variation-site detecting apparatus.

Further the ferrite powder contained in the magnetic material 38 rather tends to give rise to the formation of a diamagnetic field, reducing the permeability of the magnetic member 38. Therefore, a decline appears in the changes of the inductance of the cable 32 resulting from temperature variations near the prescribed Curie temperature of the magnetic material 38, and consequently in the sensitivity with which the temperature variation-site detecting apparatus detects temperature variations.

SUMMARY OF THE INVENTION

It is accordingly the object of this invention to provide an apparatus for detecting the local temperature variations of an object and the sites of the temperature variations, the apparatus being provided with a temperature-sensing element capable of being easily manufactured and detecting temperature with an elevated sensitivity.

To attain the above-mentioned object, this invention provides an apparatus for detecting the local temperature variations of an object and the sites of the temperature variations which comprises at least one temperature-sensing element constituted by a band-shaped magnetic material having a predetermined Curie temperature; a pulse generator for supplying a pulse signal to at least one end of the temperature-sensing element; a pulse time difference detector for determining a difference between a point of time at which the pulse signal is received and a point of time at which a reflected pulse signal of the pulse signal from a site at which the characteristic impedance of the temperature-sensing element has changed is received; and a temperature variation site detector for determining a site of temperature variation from the above-mentioned time difference.

The apparatus of this invention for detecting the local temperature variations of an object and the sites of the temperature variations which is arranged as described above has the following advantages:

(1) It is possible to reduce the cost of a cable or element for detecting the local temperature variations of an object;

(2) Since a diamagnetic field produced in a magnetic material is weak, the temperature variation-site detecting apparatus has an elevated detection sensitivity;

(3) A magnetic material is saved from variations in relative permeability which have hitherto occurred due to the distribution of, for example, ferrite powder. Therefore, the Curie temperature of a temperature-sensing element can be easily predetermined.

(4) The distribution of a magnetic material is little likely to change during the application of the subject temperature variation-site detecting apparatus. Therefore, the apparatus can sustain a reliable detection capacity over a long period of time;

(5) If the band-shaped magnetic member is formed of amorphous magnetic material having a high relative permeability than ferrite, then the subject temperature variation-site detecting apparatus is improved in detection sensitivity; and (6) If the band-shaped magnetic material is made to concurrently act as a pulse transmission conductor for a temperature-sensing element, then the element is simplified in arrangement.

BRIEF DESCRIPTION OF THE DRAWINGS

Other features and advantages of the invention will be apparent from the following description taken in connection with the accompanying drawings wherein:

FIGS. 3(a) and 3(b) are signal waveform diagrams respectively showing the relation of a pulse signal and the reflection;

FIG. 4 is an oblique view of a temperature-sensing element according to one embodiment of this invention;

FIG. 5 schematically illustrates a temperature variation-site detecting apparatus using the temperature-sensing element of FIG. 4;

FIGS. 6 to 14 show temperature-sensing elements according to other embodiments of the invention;

DETAILED DESCRIPTION OF THE REFERRED EMBODIMENTS

Figure 1:
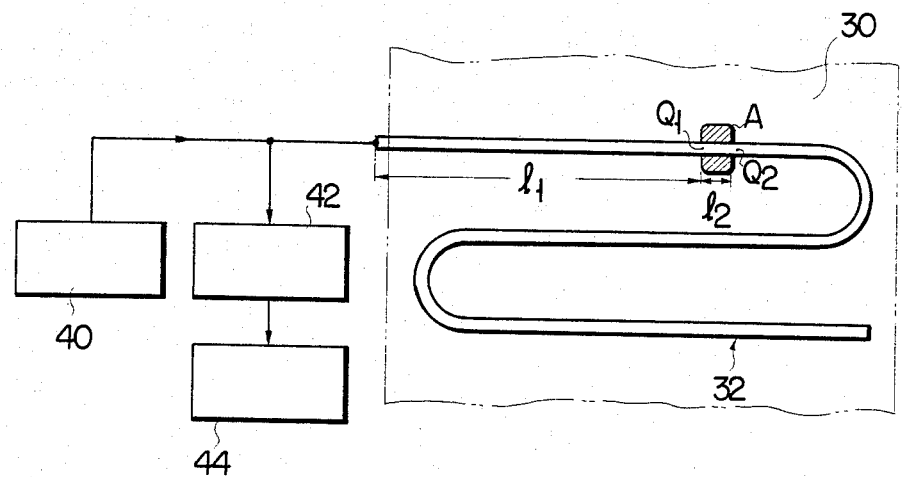
FIG. 1 schematically shows a prior art temperature variation-site detecting apparatus.

FIG. 4 shows a cable type temperature-sensing element 46 according to one embodiment of this invention. This temperature-sensing element 46 comprises a band-shaped amorphous magnetic material 48 having a Curie temperature corresponding to the lower limit of an anticipated abnormal temperature range and two coiled conductors 50, 52 coated with an insulation layer and wound about the band-shaped amorphous magnetic material 48. As used with this invention, the amorphous magnetic material 48 is an alloy which mainly consists of a ferromagnetic transition metal such as iron, copper or nickel and has a prominently higher relative permeability than ferrite powder. The amorphous magnetic material 48 has a width of, for example, 2 mm and a thickness of, for example, 20 microns and is rendered flexible. If necessary, a rare earth element, molybdenum, niobium, chromium, manganese, silicon, boron or phosphorous is added to the magnetic material 48. The temperature-sensing element 46 is, for example, mounted on an object 30 as shown in FIG. 5. The starting end of the temperature-sensing element 46 is connected to a pulse generator 40 and pulse time difference detector 42. An output signal from the pulse time difference detector 42 is supplied to the temperature variation site detector 44 of a temperature variation-site detecting apparatus 54.

Figure 2:
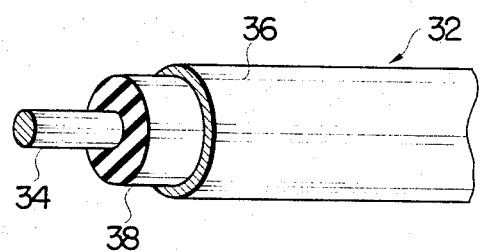
FIG. 2 is an oblique view of a conventional temperature-sensing element.
Figure 3A:
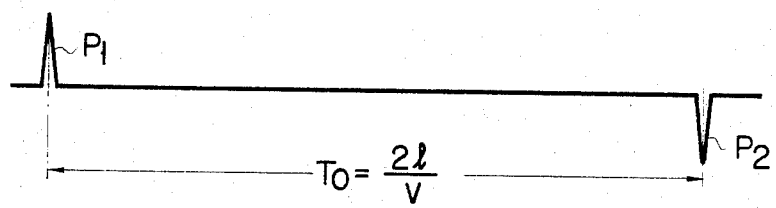

With the temperature-sensing element 46 constructed as shown in FIG. 4, the band-shaped magnetic material 48 has the same function as the magnetic material 38 of the prior art temperature sensing element 32 of FIG. 2, and determines temperature variations and the sites of the temperature variations. The band-shaped magnetic material 48 can be easily produced at low cost. The temperature-sensing element 46 is manufactured simply by winding two insulation layer coated-conductors 50, 52 around the band-shaped magnetic material 48 at a few lower cost than the prior art temperature-sensing element 32, thereby making it possible to manufacture a temperature variation-site detecting apparatus 54 at reduced cost.

A diamagnetic field formed in the band-shaped amorphous magnetic material 48 is weak, thereby assuring a relative permeability as higher as 100 to 1000 times than that of the prior art magnetic material formed of ferrite powder. Since the band-shaped magnetic material 48 is wound with two conductors 50, 52, the temperature-sensing element 46 has a more increased inductance. Therefore, for more noticeable variations than in the conventional ferrite powder type temperature-sensing element 32 take place in the inductance of the band-shaped magnetic material 48 in the proximity of its Curie temperature, that is, the characteristic impedance of the temperature-sensing element 46. As a result, a pulse signal reflected from a site having an abnormal temperature has a higher level or intensity, thereby prominently elevating the detection sensitivity of the temperature variation-site detecting apparatus 54.

The Curie temperature of the amorphous magnetic material 48 can be selected over a considerably broad range depending on the material chosen. Accordingly, the magnetic material 48 offers the advantage that the upper or lower limit of an anticipated abnormal temperature range can be freely predetermined.

The amorphous magnetic material 48 is formed of a band-shaped alloy whose permeability is uniformly distributed throughout the temperature-sensing element 46, thereby preventing pulse signals reflected from various sites of the temperature-sensing element 46 from being unbalanced in intensity, and consequently elevating the efficiency of the temperature-sensing element 46.

With the amorphous magnetic material 48 having a strong alloyed structure, atoms constituting the magnetic material 48 little tend to present rearrangement during the application of the magnetic material 48, thereby reducing the possibility of the relative permeability of the temperature-sensing element 46 being changed during its application.

Figure 6:
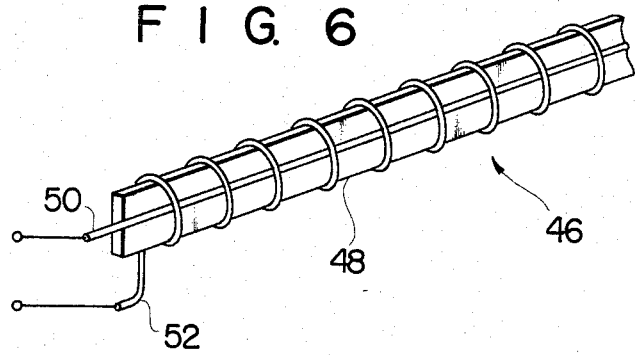

FIG. 6 shows a temperature-sensing element 46 according to a second embodiment of the invention. This temperature-sensing element 46 also comprises a band-shaped magnetic material 48 having a prescribed Curie temperature and two conductors 50, 52. In the second embodiment, however, one conductor 52 is wound about the band-shaped magnetic material 48 from end to end, whereas the other conductor 50 extends along one lateral side of the band-shaped magnetic material 48. The temperature-sensing element 46 according to the second embodiment still has the same effect as that of the first embodiment.

Figure 7:
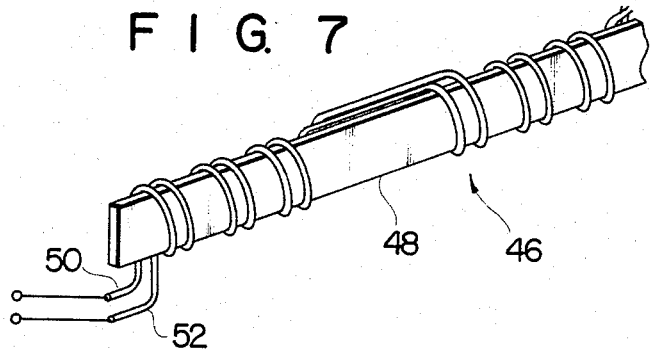

FIG. 7 indicates a temperature-sensing element 46 according to a third embodiment of the invention. The parts the same as those of FIGS. 4 and 5 are denoted by the same numerals, description thereof being omitted. The temperature-sensing element 46 according to the third embodiment comprises a band-shaped magnetic material 48 and two conductors 50, 52 which are wound about the band-shaped magnetic member 48 along its axis at a predetermined interval in a prescribed number of turns for each interval.

Figure 8:
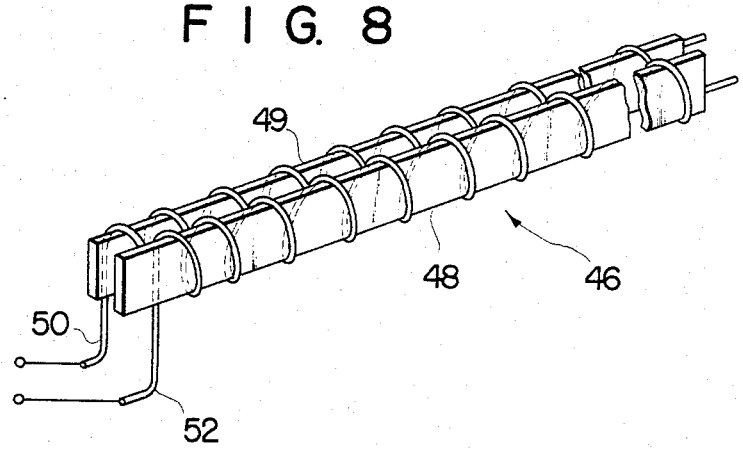

FIG. 8 sets forth a temperature-sensing element 46 according to a fourth embodiment of this invention, which is constructed by winding two conductors 50, 52 respectively about two parallel extending band-shaped magnetic materials 48, 49.

Figure 9:
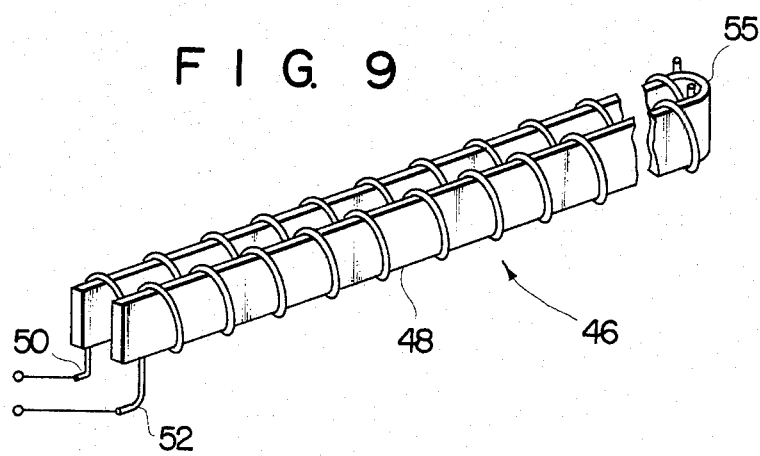

FIG. 9 illustrates a temperature-sensing element 46 according to a fifth embodiment of this invention, which is constructed by winding two conductors 50, 52 respectively about two parallel extending arms of a U-shaped magnetic material 48 bent at the center 55.

Figure 10:
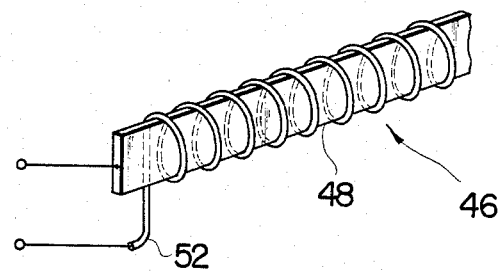

FIG. 10 indicates a temperature-sensing element 46 according to a sixth embodiment of this invention, which is constructed by winding a conductor 52 coated with an insulation layer about a band-shaped amorphous magnetic material 48. The band-shaped magnetic material 48 constitutes a pulse signal-transmitting circuit. The conductive amorphous magnetic material 48 which concurrently acts as a conductor and magnet simplifies the construction of the temperature-sensing element 46.

Figure 11:
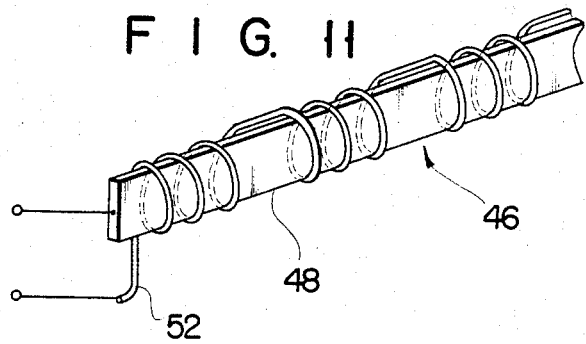

FIG. 11 shows a temperature-sensing element 46 according to a seventh embodiment of this invention, which is constructed by winding a conductor 52 about a band-shaped magnetic material 48 constituting a pulse signal-transmitting circuit along the axis of the magnetic material 48 at a predetermined interval in a prescribed number of turns for each interval. Obviously, the temperature-sensing element 46 of FIG. 11 still has the same efficiency as the preceding embodiments.

FIG. 12 illustrates a temperature-sensing element 46 according to an eighth embodiment of this invention, which is formed of two band-shaped amorphous magnetic materials 48, 49 arranged is parallel at a prescribed interval to jointly constitute a pulse signal-transmitting circuit.

FIG. 13 shows an improved temperature-sensing element 46 according to a ninth embodiment of this invention, which comprises a band-shaped amorphous magnetic material 48 having a prescribed Curie temperature, insulation layer 56 prepared from, for example, polyethylene to cover the magnetic material 48 and conductor 52 wound about the insulation layer 56. The band shaped conductive amorphous magnetic material 48 acts as a pulse signal-transmitting circuit. The magnetic material 48 concurrently acting as a conductor and magnet simplifies the construction of the temperature-sensing element 46. The insulation layer 56 should preferably be prepared from a material which does not melt at a lower temperature than the Curie temperature of the magnetic material 48, for example, Teflon, nylon, polyvinyl chloride, polyurethane or polyethylene.

FIG. 14 sets forth a temperature-sensing element 46 according to a tenth embodiment of this invention, which comprises a band-shaped magnetic material 48, insulation layer 56 coated thereon, and conductor 52 wound about the insulation layer 56 along its axis at a prescribed interval in a predetermined number of turns for each interval. The temperature-sensing element 46 of FIG. 14 has the same efficiency as the preceding embodiments.

Figure 15:
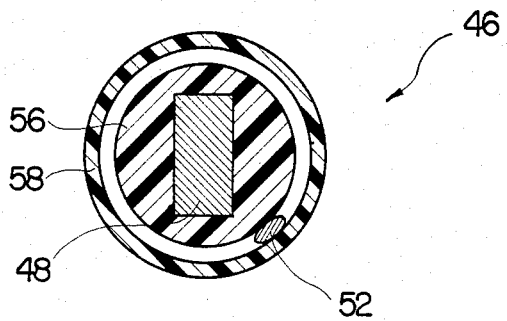
FIGS. 15 and 16 are the cross sectional views of temperature-sensing elements according to still other embodiments of the invention.

FIG. 15 indicates the cross section of a temperature-sensing element 46 according to an eleventh embodiment of this invention, which comprises a band-shaped magnetic material 48, insulation layer 56 coated thereon, conductor 52 wound about the insulation layer 56 and shielding member 58 wound about the coiled conductor 52 and acting as an electrical insulation layer. The temperature-sensing element 46 is reliably insulated from the other cables and is also little affected by noises.

Figure 16:
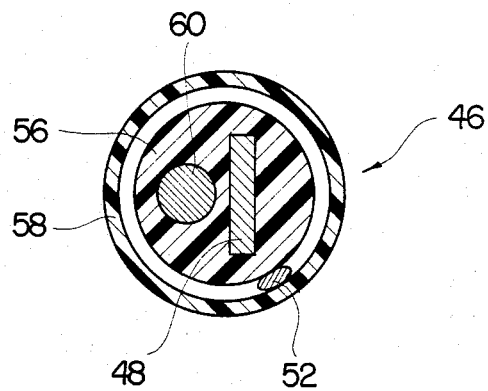

FIG. 16 shows the cross section of a temperature-sensing element 46 according to a twelfth embodiment by this invention. With this twelfth embodiment, a conductive core 60 is surrounded by an insulation layer 56 in a state insulated from a band-shaped magnetic material 48. Where the band-shaped amorphous magnetic material 48 has a relatively high resistance, then difficulties tend to be presented in processing a transmitted or reflected pulse signal. If in such case, a temperature-sensing element 46 constructed as shown in FIG. 16 is applied, then the conductive core 60 can be used as a pulse signal-transmitting circuit.

Figure 17:
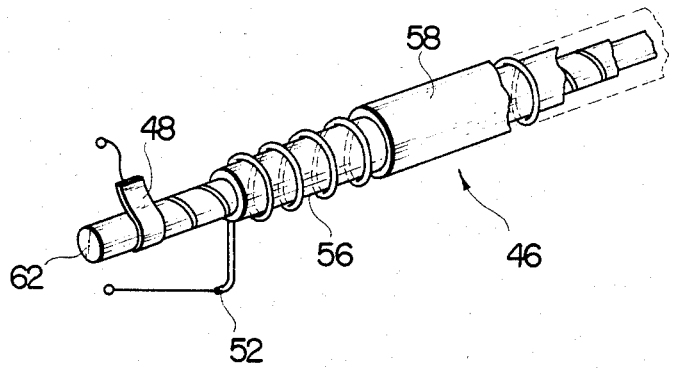
FIGS. 17 to 19 are oblique views of temperature-sensing elements according to further embodiments of the invention.

FIG. 17 illustrates a temperature-sensing element 46 according to a thirteenth embodiment of this invention, which comprises an insulation core member 62 prepared from, for example, synthetic resin, band-shaped amorphous magnetic material 48 wound about the core member 62, insulation layer 56 coated on the magnetic material 48, conductor 52 wound about the insulation layer 56 and shielding member 58 coated on the insulation layer 56 and acting as an electrical insulation layer. The band-shaped magnetic material 48 may be wound spatially or so closely as to cause every adjacent turns to be electrically contacted by each other. The band-shaped amorphous magnetic material 48 may be linearly mounted on one lateral side of the insulation core member 62.

Figure 18:
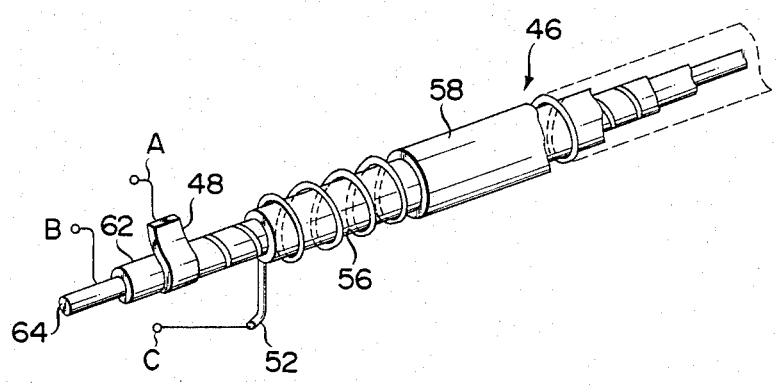

FIG. 18 indicates a temperature-sensing element 46 according to a fourteenth embodiment of this invention, which is constructed by inserting a conductive core 64 made of, for example, copper, into the core member 62 of FIG. 17 which is formed of insulation material. The core 64 acting as a reinforcement for the insulation core member 62 enables the band-shaped amorphous magnetic material 48 to be easily wound about the insulation core member 62. The temperature-sensing element 46 of FIG. 18 has the advantage that any two of the terminals A, B, and C can be respectively used as the input and output terminals of a pulse signal. For example, where the terminals B and C are used for the above-mentioned object, then it is possible to detect the local impedance variations of the amorphous magnetic material 48 through a considerably low circuit resistance.

Figure 19:
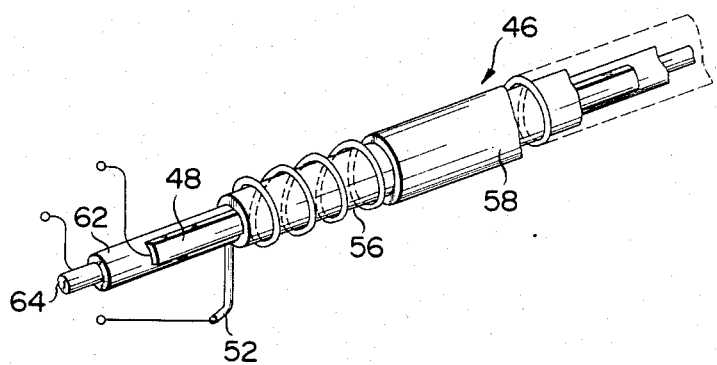

FIG. 19 indicates a temperature-sensing element 46 according to a fifteenth embodiment of the invention, which comprises an insulation core member 62 axially penetrated by a core 64, band-shaped magnetic material 48 linearly mounted on one lateral side of the insulation core member 62, insulation layer 56 coated on the core member 62 and band-shaped magnetic material 48, conductor 52 wound about the insulation layer 56 and shielding member 58 covering the wound conductor 52 and acting as an electrical insulation layer. The core 64 may be omitted.

The temperature-sensing element of this invention is not limited to the above-mentioned embodiments. For instance, the Curie temperature of the amorphous magnetic material may be properly defined in accordance with the range of a temperature to be detected. The band-shaped magnetic material is not exclusively formed of an amorphous magnetic material. Any magnetic material well serves the purpose, provided it has a relatively low Curie temperature and a high relative permeability. The process of winding the conductor, the turn pitch of the wound conductor or the length of the temperature-sensing element may be properly defined in accordance with the specification of a temperature variations-site detecting apparatus to be applied. Further, the temperature-sensing element may be constructed by providing a plurality of band-shaped magnetic materials.

A pulse signal-transmitting circuit formed of a band-shaped magnetic material and conductor jointly constituting a temperature-sensing element may be open at both ends. In this case, a pulse signal is supplied to one end of a conductor or band-shaped magnetic material, and the other end is grounded through an electric resistor.

What is claimed is:

1. An apparatus for detecting a site of a temperature variation in an object, comprising:
    an elongate temperature-sensing member including two elongate conductors constituting a signal transmission circuit, an insulating core in which one of said conductors is disposed, a band-shaped elongate amorphous magnetic alloy element mainly consisting of a ferromagnetic transition metal, having a prescribed Curie temperature corresponding to the lower limit of an anticipated abnormal temperature range, and disposed on said insulating core to extend therealong, and an elongate insulating layer disposed on said amorphous magnetic alloy element and said insulating core to cover them, the other of said conductors being wound about said insulating layer;
    a shielding member for electromagnetically shielding said temperature-sensing member;
    a pulse generator for supplying a pulse signal to one end of said temperature-sensing member;
    a pulse time difference detector for detecting a time difference between a point of time at which a pulse signal is received from said pulse generator at said one end of said temperature-sensing member and a point of time at which the pulse signal reflected from a site of said temperature-sensing member, where the characteristic impedance of said temperature-sensing member has changed due to an increase in temperature above the Curie temperature, is received at said one end of said temperature-sensing member; and
    a temperature variation site detector responsive to said pulse time difference detector for determining the site of temperature variation from the detected pulse time difference.

2. The apparatus according to claim 1, wherein at least one of said conductors is wound about said elongated amorphous magnetic alloy and insulation core.

3. The apparatus according to claim 1, wherein said other of said conductors is wound about said elongated amorphous magnetic alloy and insulation core, and said one of said conductors is enclosed in said insulation core.

4. The apparatus according to claim 1, wherein said elongated amorphous magnetic alloy is wound about said insulation core.

5. The apparatus according to claim 2, wherein said elongated amorphous magnetic alloy is wound about said insulation core.

6. The apparatus according to claim 3, wherein said elongated amorphous magnetic alloy is wound about said insulation core.

7. The apparatus according to claim 1, wherein said elongated amorphous magnetic alloy comprises a band-shaped amorphous alloy.

8. An apparatus for detecting a site of a temperature variation in an object, comprising:
    an elongate temperature-sensing member including two elongate conductors, an elongate insulating core in which one of said conductors is disposed, a band-shaped elongate amorphous magnetic alloy element mainly consisting of a ferromagnetic transition metal, having a prescribed Curie temperature corresponding to the lower limit of an anticipated abnormal temperature range and disposed to wind about said insulating core therealong, and an elongate insulating layer disposed on said amorphous magnetic alloy element and said insulating core;
    a shielding member for electromagnetically shielding said temperature-sensing member;
    a pulse generator for supplying a pulse signal to one end of said temperature-sensing member;

a pulse time difference detector for detecting a time difference between a point of time at which a pulse signal is received from said pulse generator at said one end of said temperature-sensing member and a point of time at which the pulse signal reflected from a site of said temperature-sensing member, where the characteristic impedance of said temperature-sensing member has changed due to an increase in temperature above the Curie temperature, is received at said one end of said temperature-sensing member; and a temperature variation site detector responsive to said pulse time difference detector for determining the site of temperature variation from the detected pulse time difference.

* * * * *